Figure 1:
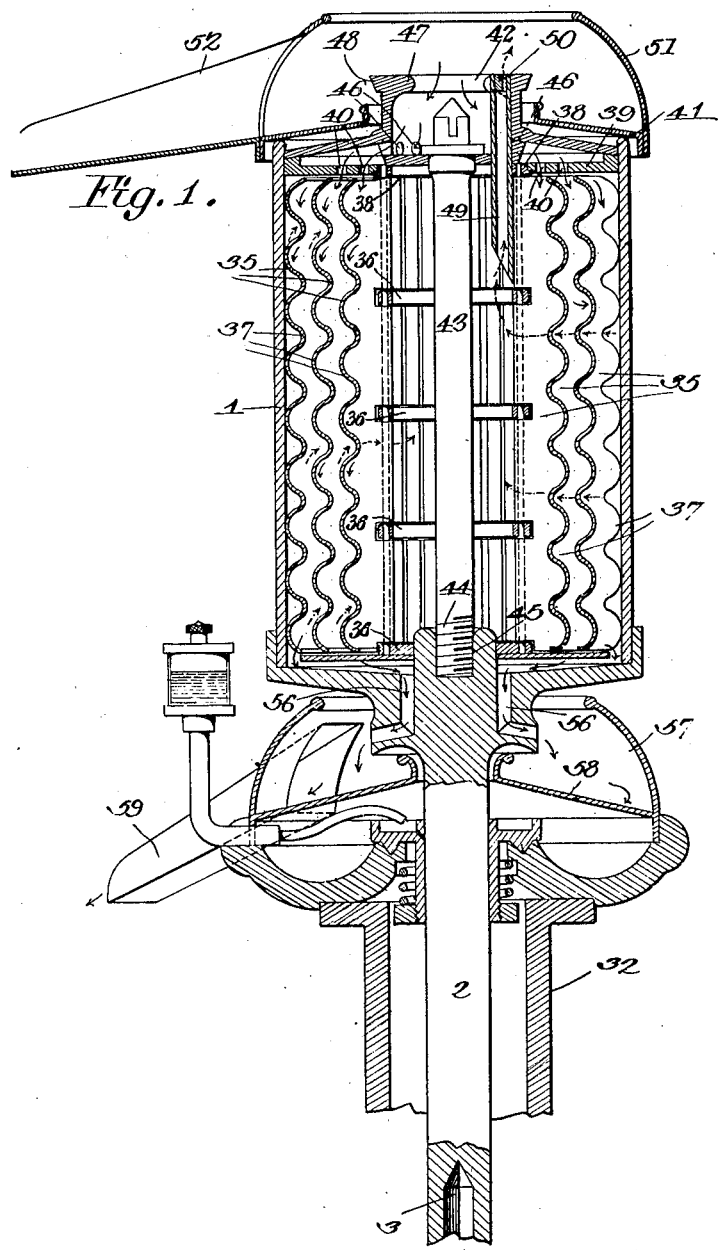

No. 837,403.  
PATENTED DEC. 4, 1906.  
L. J. HEDDERICK.  
LIQUID SEPARATOR.  
APPLICATION FILED JULY 12, 1905.

2 SHEETS—SHEET 1.

Witnesses  
Leander J. Hedderick, Inventor.  
by  
Attorneys

No. 837,403. PATENTED DEC. 4, 1906.
L. J. HEDDERICK.
LIQUID SEPARATOR.
APPLICATION FILED JULY 12, 1905.
2 SHEETS—SHEET 2.
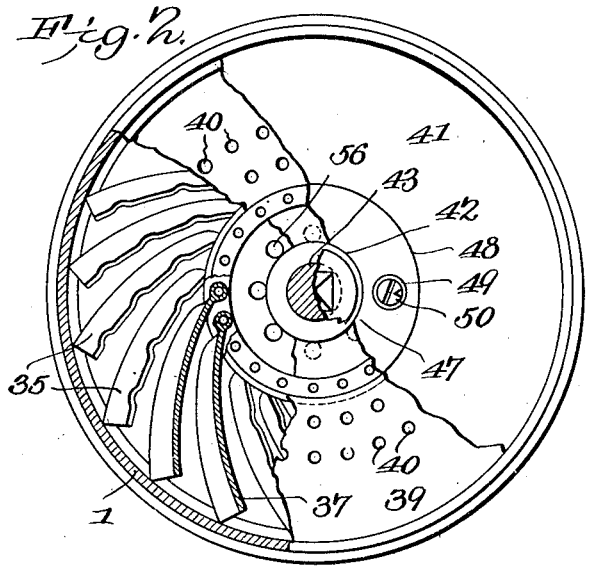
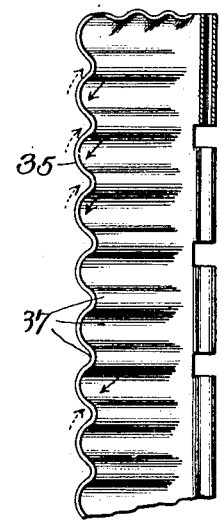
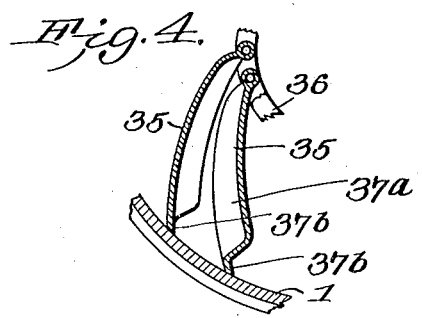
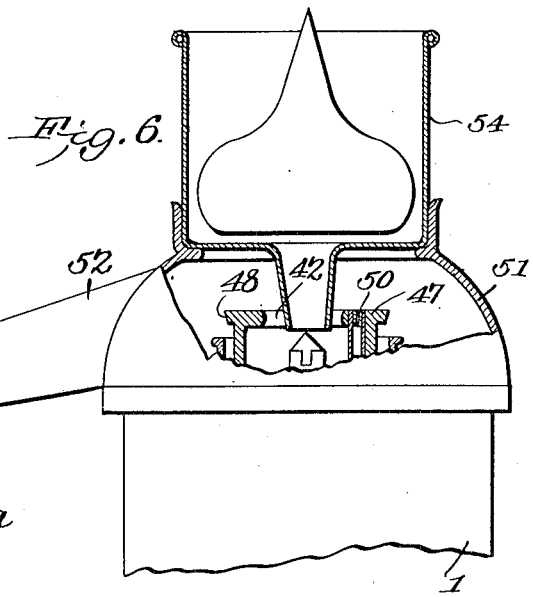
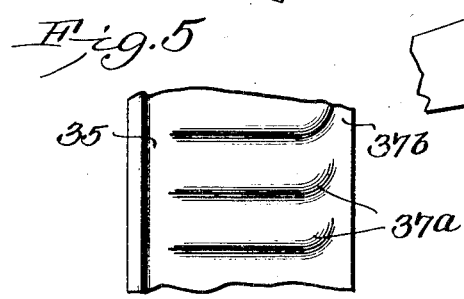
WITNESSES:
Leander J. Hedderick,
INVENTOR.
By C. A. Snow & Co.
ATTORNEYS

UNITED STATES PATENT OFFICE.

LEANDER J. HEDDERICK, OF FLORA, INDIANA.

LIQUID-SEPARATOR.

No. 837,403.

Specification of Letters Patent.

Patented Dec. 4, 1906.

Application filed July 12, 1905. Serial No. 269,369.

*To all whom it may concern:*

Be it known that I, LEANDER J. HEDDERICK, a citizen of the United States, residing at Flora, in the county of Carroll and State of Indiana, have invented a new and useful Liquid-Separator, of which the following is a specification.

The invention relates to liquid-separators, and while especially adapted and designed, and herein shown and described, as a separator for milk and cream it is to be understood that it will operate with equal facility for separating other liquids differing in specific gravity.
The object of the invention is to provide a liquid-separator embodying new and improved features of reliability and efficiency and for reducing the necessary operative power.
It is well known that in the separation of milk and cream the skimmed-milk portion being the heavier element will occupy the zone of high centrifugal force, while the cream being of lighter specific gravity is forced to occupy the zone of less centrifugal force, that is usually termed in the art the "cream wall." In the usual construction of cream-separators, and in that herein shown and described, it is necessary for the cream globules to separate from the milk element and to travel from an outer to an inner portion of the centrifugal bowl. It is further well known that if the cream globules are grouped together forming a body and only slightly mingled with the heavier liquid they can travel to the cream wall with less resistance than if mingled indiscriminately with the heavy liquid.

It is an important object of the invention to interpose walls between the grouped cream globules and the milk molecules to separate the globules from the milk and to assist each in its passage of the other.

It is a further object of the invention to substitute a novel form of corrugated wings between the milk and the cream for the plain wings ordinarily used, as it has been demonstrated by practice that the cream globules will gather in increased numbers in the exterior corrugations, or the corrugations of less centrifugal force, being forced to seek such corrugations by the heavier milk molecules, assuming the interior corrugations or the corrugations of greatest force. It will thus be seen that the cream globules being contained in large numbers in the exterior corrugations are enabled to pass the milk molecules with the minimum resistance, thereby increasing the rapidity and thoroughness of the separations.

It will be obvious that the corrugations will greatly stiffen the wings, making them entirely self-sustaining against the high centrifugal force applied thereto, and reducing to a minimum the amount of material necessary for their construction. It is a further object of the invention to pivot the corrugated wings about a central space to be occupied by the separated cream, and to leave the outer ends of the pivoted wings entirely free, permitting them to freely expand within and bear tightly against the side of the bowl, thus to prevent the passage of liquid therebetween, but to permit the closing of the wings for their removal from the bowl for cleaning.

It is a further object of the invention to provide novel skimming-pans constructed integral for receiving and discharging the separated milk and cream from the discharge-openings of the centrifugal bowl.

With these and other objects in view the present invention consists in the combination and arrangement of parts, as will be hereinafter more fully described, shown in the accompanying drawings, and particularly pointed out in the accompanying claims, it being understood that changes in form, proportion, size, and minor details may be made within the scope of the claims without departing from the spirit or sacrificing any of the advantages of the invention.

In the accompanying drawings, Figure 1 is a vertical sectional enlarged detail view of the centrifugal bowl and its contained corrugated wings and integral skimming-pans. Fig. 2 is a top plan view of the centrifugal bowl of my improved liquid-separator shown partially in section. Fig. 3 is a view in side elevation of one of the corrugated wings forming the wing series of my improved liquid-separator Fig. 4 is a fragmentary detail transverse sectional view of one form of wings. Fig. 5 is a fragmentary view, in side elevation, of one of the wings of the series with a straight edge, as shown in Fig. 7. Fig. 6 is a section showing the means for admitting fluid from the float-cup to the charge-aperture.

Like characters of reference designate corresponding parts in the several figures of the drawings.

In its preferred embodiment the improved liquid-separating device comprises a rotatable centrifugal separator-bowl 1, cylindrical in form and rigidly mounted upon a spindle 2. The spindle 2 is provided at its lower extremity with an angular opening 3, adapted for engagement with an angular stud.

Within the centrifugal bowl 1 are disposed a plurality of wings 35, pivotally secured at their inner edges to rings 36 and forming a circular series thereabout and leaving a central open space concentric with the centrifugal bowl. The wings 35 are curved from their inner to their outer edges and on a line transverse to their lengths and to the axis of the bowl, as indicated more especially in Fig. 2. The wings 35 are also provided with a plurality of corrugations 37, following the lines of curvature and so arranged that the corrugations of each wing engage within the corresponding corrugations of the next wing in series, permitting the wings to be folded together for insertion into or removal from the bowl 1. About the upper ring 38 is disposed an annular disk 39, fitting snugly within the bowl 1 and provided with perforations 40 between the ring and its periphery and arranged to admit fluid to the top of the wings 35. The bowl 1 is provided with a closure 41 with a diameter substantially equal to the diameter of the bowl and having a central charging-aperture 42. The aperture 42 is continued by a central opening entirely through the closure member, and in which is disposed a bolt 43, extending longitudinally and axially through the bowl and engaging the bottom, as by the screw-threads 44 within the socket 45, to clamp the closure rigidly upon the wing series and to prevent the displacement of the closure. Through the walls of aperture 42 openings 46 are provided, permitting the flow of fluid from the charging-aperture through said openings and through the openings 40 into the bowl. About the top of the aperture 42 is provided an inwardly-extending flange 47 and an outwardly-extending flange 48 and through which passes a tube 49, extending within an open central space within the wing series and having a screw 50, disposed to regulate the opening at its upper end. About and beneath the flange 48 is disposed a hood 51, arranged to receive fluid discharged from the pipe 49 and provided with a discharge-pipe 52. Above the hood 51 is disposed a float-cup 54, provided with means for admitting fluid from the cup to the charging-aperture 42. At any convenient point a reservoir is mounted, provided with a cock or other approved means for admitting fluid from a reservoir to the float-cup 54.

The bottom of the centrifugal bowl is provided with a plurality of openings 56 to discharge fluid into a skimming-pan 57, arranged about the spindle 2 and resting upon a support 32, the pan being provided with a conical bottom 58 and a discharge-pipe 59 communicating therewith.

As shown in Figs. 4 and 5, the wings may be constructed with the corrugations 37$^a$ extending adjacent to but stopping short of the outer edge forming a straight edge 37$^b$, contacting with the wall 1 of the centrifugal bowl and forming a complete division of the milk from the outer wall to the central cream-opening.

The operation of the improved separator in the separation of milk and cream is as follows: The whole milk from a suitably-disposed reservoir is permitted to flow into float-cup 54 and therefrom into the charging-opening 42. From the opening 42 the whole milk is discharged through openings 46 and 40 into the centrifugal bowl and upon the corrugated wings 35. The centrifugal bowl 1 being in rapid rotation and the straight outer edges of the wings making a complete division in the liquid at their outer ends and against the bowl-wall, the heavier particles of milk congregate in the corrugations farthest from the center and which have their concaved surfaces opening toward the center, as indicated by heavy arrows. The heavier milk occupying the corrugations of greater force, the lighter cream particles are forced to assume positions in the corrugations nearer the center and in the concavities opening outwardly, as indicated by the light arrows, and in such position are protected from the action of the milk-molecules. It will thus be seen that the heavier milk particles assuming positions of greatest centrifugal force will force the lighter cream particles toward the center and into the central open space and out through the tube 49 and into the hood 51, where they will be discharged through tube 52. The heavier milk will pass downward between the wings and out through openings 56 into skimming-pan 57 and be discharged through the spout 59.

Having thus described the invention, what is claimed is—

1. In a liquid-separator, a rotating vessel, upright corrugated wings pivotally connected with each other at their inner ends and about an opening concentric with the vessel, a cap for the wings and provided with openings communicating with the wings between the pivots and the vessel, a cover for the vessel having an axial charging-opening terminating in branch openings communicating with the openings of the cap, and a discharge-tube passing through the cover and extended within the center opening of the wings.

2. In a liquid-separator, a cylindrical vessel rotatably mounted on an axial spindle rigid with the vessel and having an axial charging-opening at the top and an opening at the bottom adjacent the spindle for the discharge of the heavier liquid, a plurality of corrugated wings arranged in a circular series and disposed within and concentric with the vessel, an annular flange formed about the charging-opening and provided with a passage for the discharge of the lighter liquid, a tube registering with the flange-opening and extending within the circular series of wings, a receiving-hood disposed about the axial opening and arranged to receive the lighter liquid thrown centrifugally from the flange-opening and having an opening registering with the charging-opening, a discharge-spout communicating with the hood, a skimming-pan disposed about the spindle and arranged to receive the heavier liquid from the bottom opening, a discharge-pipe communicating with the pan, and means for rotating the spindle.

3. In a liquid-separator, a rotating vessel, upright wings pivotally connected with each other at their inner ends and about an opening concentric with the vessel, each wing being curved from its inner to its outer edge and having parallel corrugations extending from the inner to the outer edges thereof, the outer edge of each wing being straight and contacting throughout its length with the wall of the vessel, a cap for the wings and provided with openings communicating with the wings between the pivots and the vessel, a cover for the vessel having an axial charging-opening terminating in branch openings communicating with the openings of the cap, and a discharge-tube passing through the cover and extending within the center opening of the wings.

In testimony that I claim the foregoing as my own I have hereto affixed my signature in the presence of two witnesses.

LEANDER J. HEDDERICK.

Witnesses:
JOHN WILKINSON,
ELMER M. EIKENBERY.